Patented Aug. 10, 1948

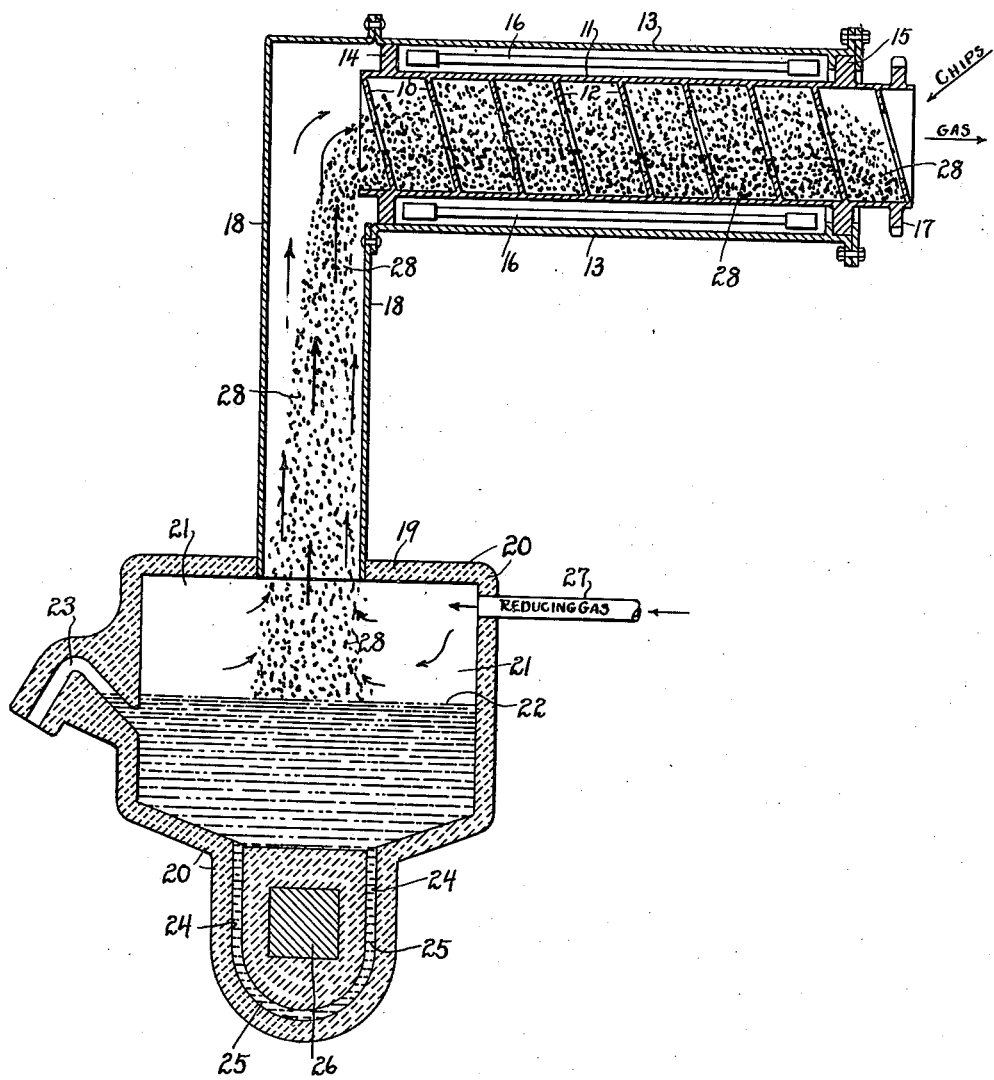

2,446,637

UNITED STATES PATENT OFFICE 2,446,637

METHOD FOR MELTING BRASS CHIPS

Donald K. Crampton, Marion, and Paul E. Petersen and Maurice L. Wood, Waterbury, Conn., assignors to Chase Brass & Copper Co., Incorporated, Waterbury, Conn., a corporation Application November 8, 1945, Serial No. 627,426

6 Claims. (Cl. 75—65)

The present invention relates to improvements in methods for melting brass and more particularly the present invention relates to improvements in methods for melting brass chips.

The term "brass chips" as used herein is intended to include the usual chips produced by the machining of brass rods and the like, as well as scrap ends resulting from the machining operations, and also other small and difficult-to-melt pieces of brass having relatively-large surface-areas per unit of weight, such for instance as small-arms cartridge-cases.

Before proceeding with a detailed description of one mode of carrying out the present invention, it may here be noted that brass chips are difficult to melt or absorb into a pool of previously melted brass for various reasons among which may be mentioned poor heat-conductivity between such a pool and the chips, when the latter remain upon the surface of the pool. This objectionable condition may be attributed to dross upon the surface of the pool, the oxidized surfaces of the brass chips or both.

Furthermore the problem of producing from brass chips, a melt corresponding in composition to the chips, has long confronted those skilled in the art with but slight progress toward an effective and economical solution. In this connection the volatilization and consequent loss of zinc has been one of the major difficulties.

In order that certain phases of the present invention may be better understood, attention may be called to the fact that particles of iron are almost inevitably included in brass chips, most often as the result of the chipping of tools and the like during machining operations. As used herein, the term "iron" is intended to connote iron, steel, and other ferrous alloys.

It has heretofore been the general practice in preparing for the melting of brass chips containing iron particles, to pass the chips over or through a magnetic separator to remove as much of the iron as possible in an effort to avoid having such iron particles appear in discrete form in the ultimate castings. Due, however, to the intertwined character of some of the brass chips, it is exceedingly difficult to remove small iron particles therefrom.

It may here be explained that the inclusion of small amounts of iron in brass is not ordinarily objectionable and is ofttimes beneficial if the iron goes into solution in the brass, rather than being present in the form of discrete particles.

The iron particles above referred to, even if not originally oxidized, which is most often the case, will become oxidized when subjected at high temperatures, to water vapor, steam, etc., as, for instance, when the chips are introduced into a pre-heating or melting chamber under ordinary conditions. Furthermore, brass chips will often contain moisture which will change to highly-oxidizing water vapor or steam when the chips are subjected to heat, either during pre-heating or when resting upon the surface of molten brass. Such water vapor or steam will serve to oxidize the iron particles present, as well as to cause oxidation of the zinc and copper content of the brass.

One of the objects of the present invention is to provide a superior method whereby brass chips may be rapidly and economically melted.

A further object is to provide a method of the character just referred to and characterized by producing a melt substantially corresponding in composition to the composition of the brass chips.

Another object of the present invention is to provide a superior method for melting brass chips whereby volatilized zinc will be effectively prevented from escaping and will be incorporated in the melt.

A still further object of the present invention is to provide a superior method whereby brass chips containing small quantities of discrete iron particles may be melted in such manner as to leave the resultant castings free from occlusions of discrete particles of iron.

Still another object of the present invention is to provide a superior method whereby brass chips containing small particles of iron may be melted in such manner as to result in the said iron particles going into solution with the brass.

With the above end other objects in view, as will appear to those skilled in the art from the present disclosure, this invention includes all features in the said disclosure which are novel over the prior art.

In the accompanying drawing is shown a schematic sectional view of one form of apparatus suitable for carrying out the method of the present invention.

The apparatus illustrated includes a rotary screw-conveyor generally designated by the reference character 10 and comprising a cylindrical shell 11 within which is a series of rigid screw-flights 12. The said screw-conveyor is mounted in any suitable manner for rotation within a housing or jacket 13. In the instance shown, the shell 11 is formed adjacent its respective opposite ends with annular mounting-flanges 14 and 15 extending out into sliding rotary engagement with the interior of the housing or jacket 13. The said mounting-flanges serve to hold the screw-conveyor in spaced relationship within the said jacket or housing to provide space for the accommodation of heater-elements 16 which latter may be in the form of electric resistance-heater units, though the screw-conveyor may be heated by any other suitable means, if desired.

The screw-conveyor 10 may be turned within the housing or jacket 13 by any suitable means, such for instance, as by a drive-chain (not shown) fitting over a sprocket-wheel 17 formed upon the outer end of the shell 11 at a point beyond the adjacent outer end of the said housing or jacket 13, as is illustrated in the drawing.

Tightly attached to the inner end of the housing or jacket 13 and communicating with the interior thereof, is the upper end of a vertical duct 18 having its lower end attached in a gas-tight manner to the upper wall 19 of an induction furnace generally designated by the reference character 20.

The furnace 20 above referred to, may be of any suitable type and is formed in its interior with a chamber 21 adapted to contain a pool of molten brass such as is indicated by the reference character 22. At its side, the induction furnace 20 is formed with an inverted U-shaped pouring-passage 23 which communicates with the chamber 21 at a point below the top surface of the pool of molten brass 22. In this manner the said pool serves to act as a seal to prevent the undue escape at this point of reducing gases which will be hereinafter referred to.

In its lower portion, the induction furnace 20 is formed with a U-shaped channel 24 having the upper ends of each of its two arms communicating with the bottom of the chamber 21, so as to cause the molten metal to form a loop 25 constituting the secondary of a transformer, which latter has its primary provided by a magnetic core 26, in a manner well known in the art of induction furnaces.

Connected into the side or any other suitable location on the induction furnace 20 and preferably above the level of the pool 22 is a gas-supply pipe 27.

For purposes of description, it may be assumed that:

(a) The induction furnace 20 is energized and already contains the pool of molten brass 22 (with iron in solution therewith), (b) The screw-conveyor 10 is being rotated in the direction required to cause its screw-flights 12 to feed a stream of brass chips 28 into the upper end of the duct 18, (c) The heating-means for the screw-conveyor is activated, (d) A supply of brass chips 28 (with inclusions of discrete iron particles) is being continuously fed into the outer end of the screw-conveyor 10, and (e) A suitable reducing gas or mixture of reducing gases is being introduced under pressure through the gas-supply 27 into the chamber 21 of the induction furnace and is filling the said chamber and flowing upwardly through the duct 18 and the chips descending therethrough and thence through the tumbling chips in the screw-conveyor 10 for ultimate exit from the latter.

The heating-means for the screw-conveyor 10 and its contents of chips, will be of such character as to raise the temperature of the brass chips to almost their melting point by the time the said brass chips reach the inner end of the screw-conveyor 10 in position to drop down the duct 18. The chips 28 in the outer portion of the screw-conveyor 10 will not reach the maximum temperature desired but the said chips will progressively become hotter and hotter as they travel inward through the screw-conveyor until at the inner end of the screw-conveyor the said chips will reach the desired temperature close to the melting-point of the brass chips.

The reducing gas introduced into the induction furnace 20 for egress through the duct 18 and screw-conveyor 10, may be in the form of any suitable reducing gas or mixture of reducing gases such, for instance, as carbon monoxide, hydrogen, etc., carefully freed of substantially all traces of water vapor and carbon dioxide. Preferably, the reducing gas will be in the form of burned hydrocarbon gases from which substantially all traces of water vapor and carbon dioxide have been removed, while leaving mostly nitrogen, carbon monoxide, and hydrogen.

As the brass chips 28 are moved inwardly through the screw-conveyor, they will, of course, be tumbled and otherwise agitated, and under most conditions, moisture contained in the incoming brass chips will be thoroughly driven off before the said chips have moved far into the said screw-conveyor or its equivalent.

If the brass chips 28 and the included iron particles are not in an oxidized condition as the same enter the outer portion of the screw-conveyor 10, the heating of the brass chips along with the iron particles in the outer portion of the said screw-conveyor, will produce oxidation of the said iron particles and some oxidation of the brass chips themselves due to the usual contained moisture.

As the brass chips and the iron particles reach the temperature approaching the melting-point of the brass chips as they reach the inner portion of the screw-conveyor 10, the reducing gas flowing in the opposite direction will reduce the oxides. Thus, by the time the brass chips and iron particles emerge from the inner end of the screw-conveyor 10, they will have been thoroughly deoxidized.

Zinc vapor will flow upwardly from the pool of molten brass 22 through the duct 18 and under some circumstances a minor amount of zinc vapor may also be given off by the highly heated outgoing portion of the stream of brass chips in the screw-conveyor 10.

The zinc fumes above referred to will condense upon the relatively cool and already deoxidized portion of the stream of brass chips in the screw-conveyor 10 and by alloying therewith will prevent the accumulation of an excess of zinc fumes which might otherwise escape from the screw-conveyor.

The continuous agitation and tumbling of the stream of brass chips in the screw-conveyor 10, not only serves to insure the heating thereof, but also insures the maximum contact of both the reducing gas and the zinc vapor with the said chips.

Preferably and as shown, the chips 28 are dropped from a considerable height or otherwise caused to impinge upon the substantially oxide-free surface of the pool 22 of molten brass with sufficient violence to be submerged therein for ready and rapid melting.

The introduction of the reducing gas into the induction furnace 20, in addition to providing a flow for passage through the duct 18 and screw-conveyor 10, also serves to guard the pool of molten brass 22 against oxidation.

By the time the iron particles strike the pool of molten brass 20, they will be thoroughly deoxidized and will readily melt and go into solution with the molten brass, rather than remaining as discrete oxide-coated iron particles which latter would appear as occlusions in the billets cast from the molten brass.

As has been before noted herein, the inclusion in the brass of small amounts of iron is not harmful for most uses and, in fact, is in most instances beneficial, provided only that the iron be in solution with the brass and not present as discrete particles.

Assuming that the particular brass chips have a melting-point between 1630° F. and 1650° F., it would then be desirable to pre-heat the said chips to a point as close to the melting-point as is feasible without actually causing the melting thereof, and for practical purposes extremely satisfactory results are achieved if the said chips are pre-heated to within 100° F. of their actual melting-point, prior to their introduction into the pool of molten brass 22.

By pre-heating as just above described, not only is the reduction of oxide accelerated but when the said chips impinge upon the pool 22, they are so near the melting-point as not to chill the same unduly and are, therefore, quickly and continuously absorbed in the mix. Preferably and as before described, the furnace is of the induction type for the reason that it provides continuous agitation which further facilitates the rapid melting of the continuously-supplied brass chips, together with their accompanying deoxidized iron particles.

While it is possible to carry out the method of the present invention by pre-heating the chips to within 500° F. of their melting-point, the resultant slowness of the action of the reducing gases and the resultant chilling of the pool of molten brass, renders this economically inadvisable. In any event, the brass chips must be pre-heated to a temperature at least materially above 1,000° F.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. The method for melting brass chips and recovering metal contained in the oxidized portions thereof, including: maintaining a pool of previously-melted brass chips at a temperature such that the said pool will substantially immediately melt and absorb previously-heated and deoxidized chips as the latter are continuously introduced into the said pool through the surface thereof in the manner hereinafter set forth and at which temperature zinc vapors are emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense the said zinc vapors thereon while heating a portion of the said stream of chips which is in a position in advance of the cooler incoming portion to a temperature sufficiently above 1000° F. to effectively preheat the chips and to cause the hereinafter-mentioned reducing-gas to effectively deoxidize the said brass chips as well as such iron particles as may be occluded therewith; continuously passing a reducing-gas through the said stream of chips as the same are agitated and heated as aforesaid to deoxidize the said brass chips and such iron particles as may be occluded therewith; and thereafter introducing the now-heated and now-deoxidized chips through a nonoxidizing atmosphere and into the said pool of previously-melted chips while maintaining the surface of the said pool bright and substantially free of ashes, oxides and other foreign matter to thus enable the said chips to readily make a metal-to-metal contact with the surface of the said pool for being substantially immediately wetted, melted and absorbed in the said pool, the application of heat to the said pool and the introduction of the chips thereinto both being continuous and at coordinated rates to enable the said pool to melt and absorb the heated and deoxidized chips substantially as rapidly as the said chips are fed into the pool.

2. The method for melting brass chips and recovering metal contained in the oxidized portions thereof, including: maintaining a pool of previously-melted brass chips at a temperature such that the said pool will substantially immediately melt and absorb previously-heated and deoxidized chips as the latter are continuously introduced into the said pool through the surface thereof in the manner hereinafter set forth and at which temperature zinc vapors are emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense the said zinc vapors thereon while heating a portion of the said stream of chips which is in a position in advance of the cooler incoming portion to a temperature within about 100° F. of the melting point of the said brass chips to effectively preheat the chips and to cause the hereinafter-mentioned reducing-gas to effectively deoxidize the said brass chips as well as such iron particles as may be occluded therewith; continuously passing a reducing-gas through the said stream of chips as the same are agitated and heated as aforesaid to deoxidize the said brass chips and such iron particles as may be occluded therewith; and thereafter introducing the now-heated and now deoxidized chips through a nonoxidizing atmosphere and into the said pool of previously-melted chips while maintaining the surface of the said pool bright and substantially free of ashes, oxides and other foreign matter to thus enable the said chips to readily make a metal-to-metal contact with the surface of the said pool for being substantially immediately wetted, melted and absorbed in the said pool, the application of heat to the said pool and the introduction of the chips thereinto both being continuous and at coordinated rates to enable the said pool to melt and absorb the heated and deoxidized chips substantially as rapidly as the said chips are fed into the pool.

3. The method for melting brass chips and recovering metal contained in the oxidized portions thereof, including: maintaining a pool of previously-melted brass chips at a temperature such that the said pool will substantially immediately melt and absorb previously-heated and deoxidized chips as the latter are continuously introduced into the said pool through the surface thereof in the manner hereinafter set forth and at which temperature zinc vapors are emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense the said zinc vapors thereon while heating a portion of the said stream of chips which is in a position in advance of the cooler incoming portion to a temperature sufficiently above 1,000° F. to effectively preheat the chips and to cause the hereinafter-mentioned reducing-gas to effectively deoxidize the said brass chips as well as such iron particles as may be occluded therewith; continuously passing a reducing-gas through the said stream of chips as the same are agitated and heated as aforesaid to deoxidize the said brass chips and such iron particles as may be occluded therewith; and thereafter introducing the now-heated and now-deoxidized chips through a nonoxidizing atmosphere and into the said pool of previously-melted chips while maintaining the surface of the said pool bright and substantially free of ashes, oxides and other foreign matter to thus enable the said chips to readily make a metal-to-metal contact with the surface of the said pool for being substantially immediately wetted, melted and absorbed in the said pool, the application of heat to the said pool and the introduction of the chips thereinto both being continuous and at coordinated rates to avoid the accumulation of a substantial blanket of unmelted chips upon the surface of the said pool.

4. The method for melting brass chips and recovering metal contained in the oxidized portions thereof, including: maintaining a pool of previously-melted brass chips at a temperature such that the said pool will substantially immediately melt and absorb previously-heated and deoxidized chips as the latter are continuously introduced into the said pool through the surface thereof in the manner hereinafter set forth and at which temperature zinc vapors are emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense the said zinc vapors thereon while heating a portion of the said stream of chips which is in a position in advance of the cooler incoming portion to a temperature within about 100° F. of the melting point of the said brass chips to effectively preheat the chips and to cause the hereinafter-mentioned reducing-gas to effectively deoxidize the said brass chips as well as such iron particles as may be occluded therewith; continuously passing a reducing-gas through the said stream of chips as the same are agitated and heated as aforesaid to deoxidize the said brass chips and such iron particles as may be occluded therewith; and thereafter introducing the now-heated and now-deoxidized chips through a nonoxidizing atmosphere and into the said pool of previously-melted chips while maintaining the surface of the said pool bright and substantially free of ashes, oxides and other foreign matter to thus enable the said chips to readily make a metal-to-metal contact with the surface of the said pool for being substantially immediately wetted, melted and absorbed in the said pool, the application of heat to the said pool and the introduction of the chips thereinto both being continuous and at coordinated rates to avoid the accumulation of a substantial blanket of unmelted chips upon the surface of the said pool.

5. The method for melting brass chips and recovering metal contained in the oxidized portions thereof, including: maintaining a pool of previously-melted brass chips at a temperature such that the said pool will substantially immediately melt and absorb heated and deoxidized chips as the latter are continuously sprinkled upon the surface of the said pool in the manner hereinafter set forth and at which temperature zinc vapor is emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense zinc vapor thereon while heating a portion of the said stream of chips which is in advance of the cooler incoming portion to a temperature sufficiently above 1,000° F. to effectively preheat the same and cause the hereinafter-mentioned reducing-gas to effectively deoxidize the said brass chips as well as such iron particles as may be occluded therewith; passing a reducing-gas through the said stream of chips as the same is agitated and heated as aforesaid to deoxidize the said brass chips as well as such iron particles as may be occluded therewith; and thereafter sprinkling the now-heated and now-deoxidized chips in the form of dispersed discrete particles through a nonoxidizing atmosphere and upon the surface of the said pool of previously melted chips while maintaining the surface of the said pool bright and substantially free of ashes, oxides and other foreign matter to thus enable the said chips to readily make metal-to-metal contact with the bright and clean surface of the said pool, the application of heat to the said pool and the sprinkling of the said chips upon the surface of the latter both being continuous and at co-ordinated rates to enable the said pool to wet, melt and absorb the heated and deoxidized chips substantially as rapidly as the said chips are sprinkled upon the surface of the said pool.

6. The method for melting brass chips and recovering metal contained in the oxidized portions thereof, including: maintaining a pool of previously-melted brass chips at a temperature such that the said pool will substantially immediately melt and absorb heated and deoxidized chips as the latter are continuously sprinkled upon the surface of the said pool in the manner hereinafter set forth and at which temperature zinc vapor is emitted from the surface of the said pool; continuously simultaneously advancing and agitating a stream of brass chips through an air-excluding duct together with such iron particles as may be occluded therewith; maintaining an incoming portion of the said stream of chips at a temperature sufficiently low to condense zinc vapor thereon while heating a portion of the said stream of chips which is in advance of the cooler incoming portion to a temperature within about 100° F. of the melting point of the said brass chips to effectively preheat the same and cause the hereinafter-mentioned reducing-gas to effectively deoxidize the said brass chips as well as such iron particles as may be occluded therewith; passing a reducing-gas through the said stream of chips as the same is agitated and heated as aforesaid to deoxidize the said brass chips as well as such iron particles as may be occluded therewith; and thereafter sprinkling the now-heated and now-deoxidized chips in the form of dispersed discrete particles through a nonoxidizing atmosphere and upon the surface of the said pool of previously melted chips while maintaining the surface of the said pool bright and substantially free of ashes, oxides and other foreign matter to thus enable the said chips to readily make metal-to-metal contact with the bright and clean surface of the said pool, the application of heat to the said pool and the sprinkling of the said chips upon the surface of the latter both being continuous and at coordinated rates to enable the said pool to wet, melt and absorb the heated and deoxidized chips substantially as rapidly as the said chips are sprinkled upon the surface of the said pool.

DONALD K. CRAMPTON.
PAUL E. PETERSEN.
MAURICE L. WOOD.

REFERENCES CITED

The following references are of record in the file of this patent:

UNITED STATES PATENTS

| Number | Name | Date |
|---|---|---|
| 969,253 | Diack | Sept. 6, 1910 |
| 1,328,712 | Clark | Jan. 20, 1920 |
| 1,328,714 | Clark | Jan. 20, 1920 |
| 1,411,157 | Bradley | Mar. 28, 1922 |
| 1,987,952 | Wilson | Jan. 15, 1935 |